(12) United States Patent
Bouat

(10) Patent No.: US 8,391,908 B2
(45) Date of Patent: Mar. 5, 2013

(54) COMMUNICATION SYSTEMS

(75) Inventor: Sebastien Bouat, St Martin d'Uriage (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 871 days.

(21) Appl. No.: 11/791,315

(22) PCT Filed: Nov. 28, 2005

(86) PCT No.: PCT/EP2005/056285
§ 371 (c)(1),
(2), (4) Date: Nov. 5, 2007

(87) PCT Pub. No.: WO2006/056618
PCT Pub. Date: Jun. 1, 2006

(65) Prior Publication Data
US 2008/0194247 A1    Aug. 14, 2008

(30) Foreign Application Priority Data

Nov. 29, 2004  (EP) .................................. 04300821

(51) Int. Cl.
*H04B 7/00* (2006.01)
*H04B 1/56* (2006.01)
*H04M 3/42* (2006.01)

(52) U.S. Cl. ...................... 455/518; 370/276; 379/202.1

(58) Field of Classification Search .............. 455/518, 455/519; 370/276, 296; 379/202.01–218.02
See application file for complete search history.

(56) References Cited

U.S. PATENT DOCUMENTS

| | | | | |
|---|---|---|---|---|
| 5,764,736 | A * | 6/1998 | Shachar et al. | 379/93.09 |
| 6,606,305 | B1 * | 8/2003 | Boyle et al. | 370/260 |
| 6,763,226 | B1 | 7/2004 | McZeal | |
| 7,069,032 | B1 * | 6/2006 | El-Fishawy | 455/517 |
| 7,230,930 | B2 * | 6/2007 | Ahya et al. | 370/278 |
| 7,522,584 | B2 * | 4/2009 | Kautz et al. | 370/354 |
| 7,630,330 | B2 * | 12/2009 | Gatts | 370/277 |
| 7,636,327 | B1 * | 12/2009 | Doran | 370/276 |
| 2004/0002305 | A1 * | 1/2004 | Byman-Kivivuori et al. | 455/41.2 |
| 2005/0260976 | A1 * | 11/2005 | Khartabil et al. | 455/416 |

FOREIGN PATENT DOCUMENTS

| | | |
|---|---|---|
| EP | 1 324 550 | 7/2003 |
| WO | 01/67675 | 9/2001 |
| WO | WO 2004089012 A2 * | 10/2004 |

* cited by examiner

*Primary Examiner* — Michael Faragalla
*Assistant Examiner* — Scott Au

(57) ABSTRACT

According to one aspect of the present invention, there is provided a method, during a first communication on a first communication system, of establishing a second communication on a second communication system, comprising inviting a predetermined user to the first communication, the invitation of the predetermined user causing the establishment of the second communication.

17 Claims, 3 Drawing Sheets

COMMUNICATION SYSTEMS

TECHNICAL FIELD

The present invention relates to communication systems, and particular to a method and apparatus for use with multiple communication systems.

BACKGROUND

There exist a variety of electronic communication systems which enable users to communicate in real, or in substantially real, time. Perhaps the most common such communication system is the conventional telephone system, which enables two users to converse in real-time over a voice network. Through the use of telephone conferencing systems, groups of two or more users may converse in a similar manner.

More recent communication systems include instant messaging (IM), push-to-talk (PTT) and voice over Internet protocol (VoIP) systems.

Instant messaging systems enable text messages to be exchanged between members of a group in substantially real-time. In this way, members of the group may participate in text-based conversations. Push-to-talk systems enable voice messages to be exchanged between members of a group in substantially real-time. Push-to-talk uses a voice over Internet protocol (VoIP) based system designed primarily for use with restricted bandwidth data networks, such as those typically accessible from mobile communications terminals such as mobile telephones. For this reason, push-to-talk is often referred to as push-to-talk over cellular (PoC). Due to the bandwidth restrictions of many mobile data networks, push-to-talk provides half-duplex communications, with the user experience being similar to that provided by conventional citizens band (CB) radio and walkie-talkies.

Many modern communication devices, especially modern mobile communication devices such as mobile telephones, enable the user to communicate using more than one communication system. For example, many modern mobile communication devices support conventional mobile voice networks as well as providing instant messaging and push-to-talk functionality using mobile data networks.

During a communication, such as a conversation, using one type of communication system, such as push-to-talk, it may be desired, for example by one or more participants of the communication, for the communication to take place using a different type of communication system. This may occur for a variety of reasons.

For example, during a push-to-talk conversation, there may come a point where the half-duplex nature of push-to-talk becomes an inhibitor to the communication. In this case, it may be desirable, for example, to establish a conventional voice network based telephone conference to enable the conversation to continue in a full-duplex manner.

Similarly, during a text-message based instant messaging communication, or conversation, it may be decided, by one or more of the participants thereof, to establish a conventional voice network based telephone conference to enable the conversation to become a spoken, rather than a typed, conversation.

Currently, however, there is no easy way in which a communication using one type of communication system may be switched to, transferred to, or continued on a different type of communication system.

One reason for this is that on a typical communication terminal the software applications which typically control each of the different communication systems are typically independent from one another and are generally provided by different suppliers. Furthermore, since there are currently no defined standards which enable each of the various applications to interact by way of a standard application programmer interface (API), or the like, there is generally little or no interaction possible between the various communication applications.

For example, the only way of establishing a conventional voice network-based telephone conference whilst participating in a push-to-talk communication is to manually establish a conventional telephone conference and to continue the communication thereon. Furthermore, since current mobile communication devices are not able to simultaneously handle voice and data communications, each user also has to manually terminate the push-to-talk communication prior to establishing a telephone call with the conferencing service.

This is particularly inconvenient to the user.

One way in which some of the above problems may be overcome, however, is to ensure that each of the different communication software applications do interact in an appropriate manner. However, such an approach requires a standardisation of the interfaces between each of the different software applications, and requires that developers of such applications adhere to any such standards. Even if such standard interfaces were agreed upon, however, there is no guarantee that all such software applications would conform to the standards. Such a situation is particularly inconvenient to the user, who simply desires a simple way to change the communication system used for a current communication to a more appropriate communication system.

SUMMARY

Accordingly, one aim of the present invention is to overcome, or at least alleviate, at least some of the above mentioned problems.

According to a first aspect of the present invention, there is provided a method, during a first communication on a first communication system, of establishing a second communication on a second communication system. The method comprises inviting a predetermined user to the first communication, the invitation of the predetermined user causing the establishment of the second communication.

Advantageously, such an approach provides simply way to change the communication system used for a current communication to a more appropriate communication system. Furthermore, this approach does not require any particular interaction between the software applications controlling each type of communication system. Additionally, from a user point of view, the manner in which the communication may be established on the second of communication system is substantially the same for all users, regardless of the particular communication terminal or communication applications used.

Suitably the first communication is established through a first communication manager, and the second communication is established through a second communication manager.

The first communication is suitably established between a plurality of users, and the second communication is preferably established between at least some of the plurality of users.

Suitably the predetermined user has an address, and the method further comprises receiving the invitation at an intermediate module having the address.

The intermediate module preferably has communication access to the second communication manager, and the method further comprises, upon receiving the invitation, the intermediate module causing the second communication manager to establish the second communication.

The intermediate module suitably has communication access to the first communication manager, and the method comprises, upon receiving the invitation, the intermediate module causing the first communication manager to terminate the first communication. The termination may suitably occur either before or after the establishment of the second communication.

The first communication may be a push-to-talk communication, and the second communication may be a telephone conference.

The first communication manager may be a push-to-talk service manager, and the second communication manager may be a telephone conferencing service.

The intermediate module may be a media conferencing agent.

According to a second aspect of the present invention, there is provided a telecommunication system having a first communication system for establishing a first communication, and a second communication system capable of establishing a second communication. The communication system comprises an intermediate module for receiving an invitation through the first communication system, the intermediate module arranged to, in response to receiving the invitation, establish a second communication on the second communication system.

The first communication system suitably further comprises a first communication manager for establishing the first communication between a plurality of users.

The second communications system suitably further comprises a second communication manager for establishing the second communication between at least some of the plurality of users.

The intermediate module preferably has communication access to the second communication manager.

The intermediate module is preferably arranged so as to, upon receiving the invitation, cause the second communication manager to establish the second communication.

Suitably the intermediate module has communication access to the first communication manager, and is arrange to, upon receiving the invitation, cause the first communication manager to terminate the first communication.

The first communication may be a push-to-talk communication, and the second communication may be a telephone conference.

The first communication manager is suitably a push-to-talk service manager, and the second communication manager is suitably a telephone conferencing service.

The intermediate module may suitably be a media conferencing agent.

According to a third aspect of the present invention, there is provided a communications system arranged to operate in accordance with any of method steps outlined above.

According to a fourth aspect of the present invention, there is provided a method, during a first communication on a first communication system, of invoking an action on a communication manager used to establish the first communication, comprising inviting a predetermined user to the communication, receiving the invitation at an intermediate module and, upon receipt of the invitation, the intermediate module causing the communication manager to invoke a predetermined action.

According to a fifth aspect of the present invention, there is provided a telecommunication system having a first communication system for establishing a first communication, the first communication being established through a first communication manager, comprising an intermediate module for receiving an invitation through the first communication system, the intermediate module being arranged to, in response to receiving the invitation, invoke a predetermined action on the communication manager.

BRIEF DESCRIPTION OF THE DRAWINGS

Embodiments of the invention will now be described, by way of example only, with reference to the accompanying diagrams, in which.

DETAILED DESCRIPTION

In many situations the functionality provided by PTT provides a flexible, and often cheaper, alternative to using traditional telephone systems, particularly when communicating with groups of users. Additionally push-to-talk facilitates the establishment of substantially real-time voice communications between multiple participants. In many situations the half-duplex nature of PTT is largely adequate, however, conversations held over PTT tend to be more disjointed, by virtue of the half-duplex communications, than typical full-duplex conversations held using conventional telephone systems.

To facilitate the establishment of a push-to-talk communication, push-to-talk capable terminals typically allow a user to store and manage a list of buddies in a so-called buddy list. A buddy list typically contains contact details of friends, family or colleagues with whom the user frequently interacts. Additionally, the presence status of each buddy is obtained and displayed, enabling a user to determine which of his buddies are currently available and able to participate in push-to-talk communications.

Figure 1:
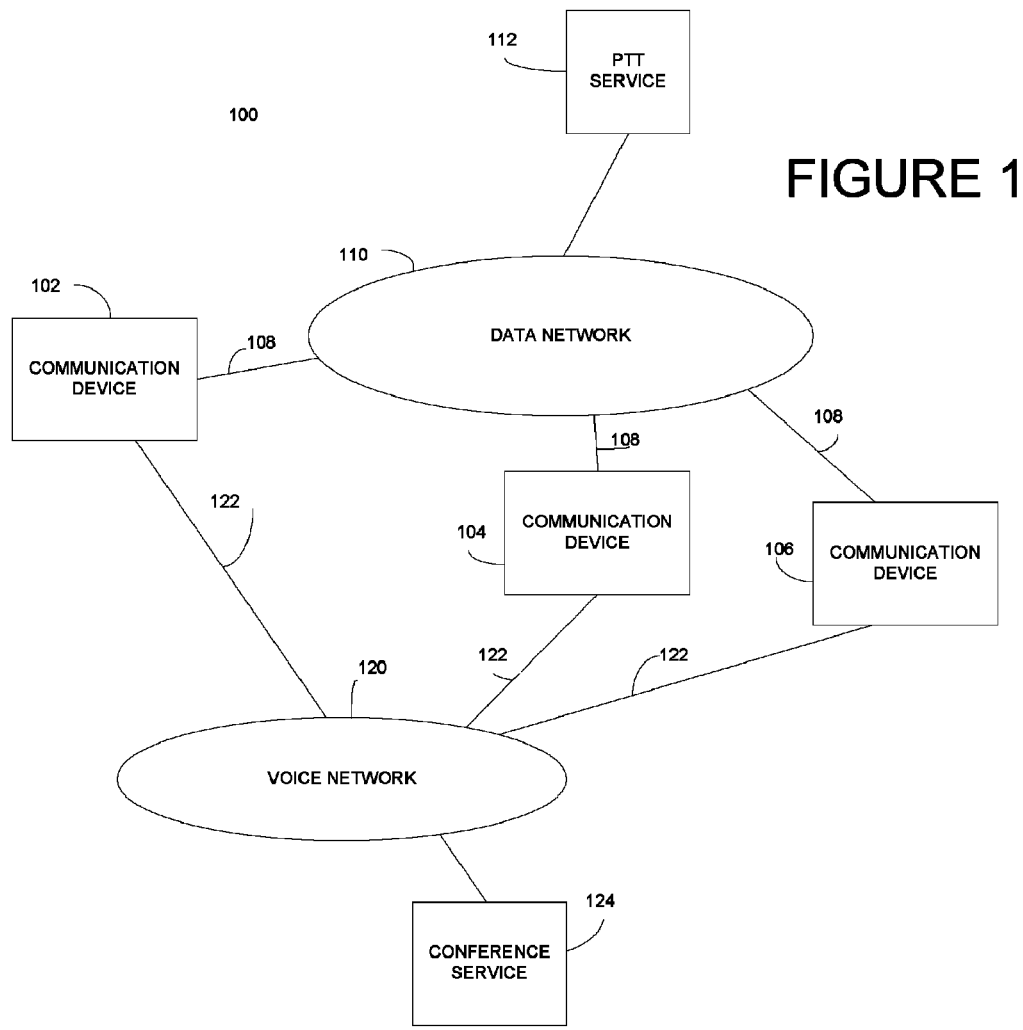
FIG. 1 is a block diagram showing an overview of a system according to the prior art.

Referring now to FIG. 1, there is a shown a block diagram of a system 100 according to the prior art. A number of mobile communication terminals 102, 104 and 106 provide access to a voice network 120 through voice channels 122, and also provide access to a data network 110 through data channels 108. The voice network may be any suitable voice network, such as a Global System for Mobile (GSM) network. The data network may be any suitable data network, such as a general packet radio system (GPRS) network. The communication terminals may be any suitable communication devices, such as mobile telephones or terminals, landline communication terminals, personal computing devices and the like.

Through the voice network 120 the communications terminal 102 may place a conventional telephone call to the communications terminal 104 in a generally known manner. The communication terminal 102 may alternatively establish a voice over IP (VoIP) communication, such as a push-to-talk communication, with the communication terminals 104 and 106 across the data network 110.

Figure 2:
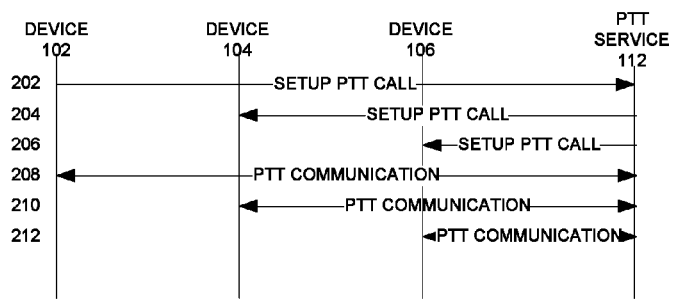
FIG. 2 is a message flow diagram outlining example messages which may flow between different elements of the system of FIG. 1 according to the prior art during a push-to-talk communication.

Referring now to FIG. 2, there is shown a message flow diagram outlining example messages which may flow between various elements of the system 100 during a push-to-talk communication according to the prior art. It should be noted that the messages shown are illustrative only, and do not necessarily relate to messages of any particular communications protocol, and do not necessarily include all of the messages that would be sent between communication terminals during a PTT communication.

The user of the communication terminal 102 selects from his buddy list the buddies or contacts with which he wishes to establish a push-to-talk communication, in this case the buddies using the communication terminals 104 and 106. The communication terminal 102 sends an appropriate PTT setup message 202, via the data network 110, to an appropriate communication manager, such as the PTT service manager, or PoK server, 112. The setup message 202 contains address details of the selected buddies, for example, in the form of a session initiation protocol (SIP) universal resource indicator (URI), or in any appropriate form.

The PTT service manager 112 responds with individual push-to-talk setup call messages 204 and 206 sent to the communication terminals identified in the setup message 202. This establishes the PTT communication with the communication terminals 106 and 106 of the selected buddies. Voice messages may be sent by the users of the communication terminals to the PTT service manager 112 which forwards the messages to the participants of the communication, as shown in messages 208, 210 and 212.

As previously mentioned, if one of the participants of the PTT communication wishes to establish a conventional full-duplex telephone conference with the participants of the PTT communication the user has to instruct the other members of the communication of his intention, and to provide information to the other participants instructing them how to manually establish a conventional telephone call with a telephone conferencing service, such as the conferencing service 124. Furthermore, since current communication terminals do not support both a data and a voice channel at the same time, the users additionally have to manually terminate their PTT calls prior to establishing a telephone call with the media conferencing service 124.

Figure 3:
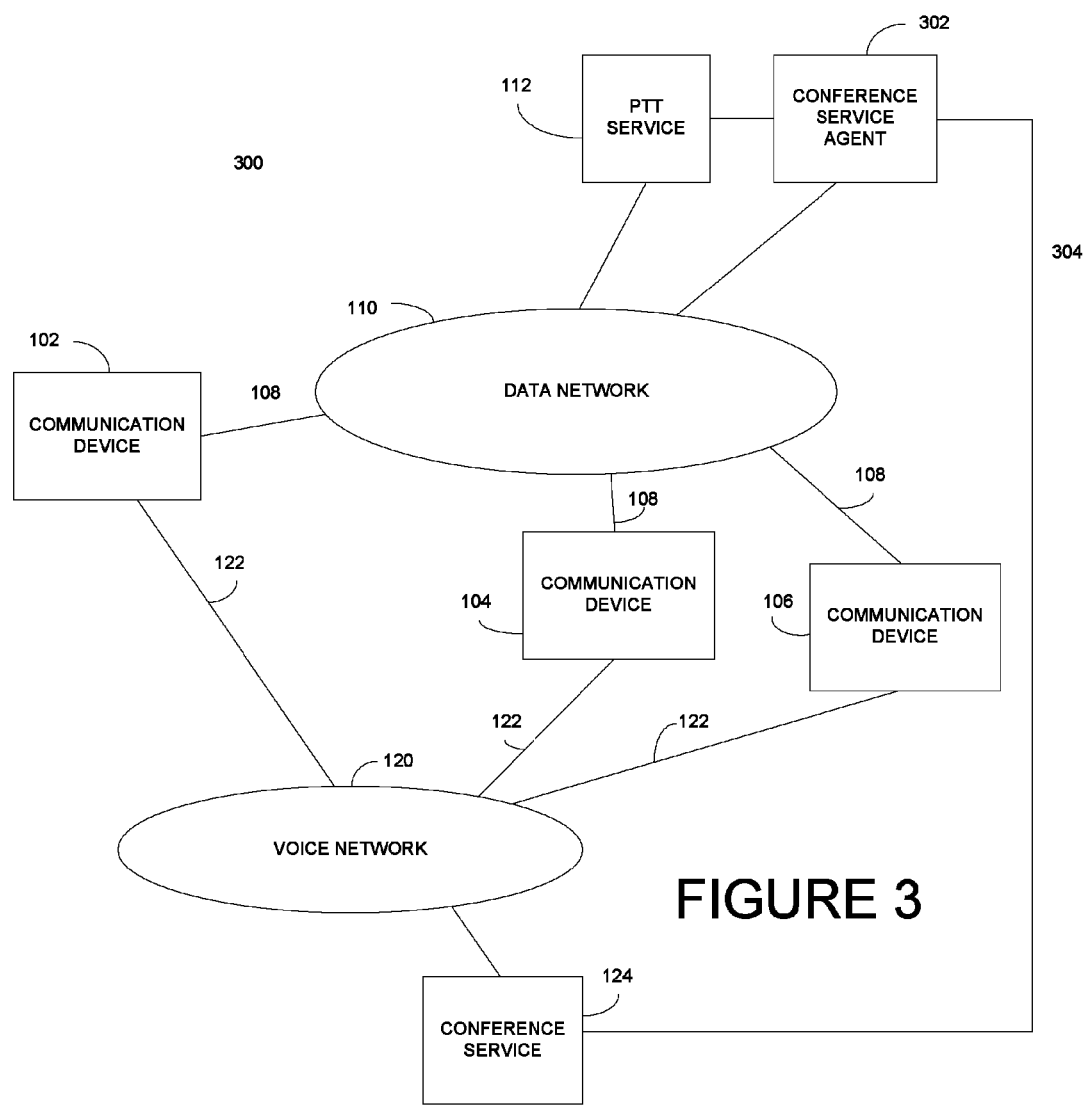
FIG. 3 is a block diagram showing an overview of a system according an embodiment of the present invention.

Referring now to FIG. 3, there is shown a block diagram of a system 300 according to an embodiment of the present invention. System 300 is essentially the same as the system 100 of FIG. 1, and like numbers represent like elements. In addition, however, to the elements shown in FIG. 1 there is provided a conferencing service agent (CSA) 302 which is connected to the data network 110, to the PTT service manager 112 and to the media conferencing service 124.

The CSA 302 preferably has a suitable known address, such as a SIP URI. This enables the CSA 302 to be added to the electronic address book or contact list of a communication terminal in a conventional manner. However, the CSA 302 may be considered as a virtual or dummy contact, since the CSE 302 does not represent a real user. In this way, though, the CSA 302 may be easily invited to a push-to-talk communication by sending an invitation in the normal way. However, since the CSA 302 is a virtual or dummy user it is not possible to establish a voice communication with the CSA 302. Rather, the inviting of the CSA 302 is used as mechanism by which a participant of a PTT communication may cause a communication using a different type of communication system, such as a conventional telephone conference, to be established in a simple and efficient manner, as explained below.

Figure 4:
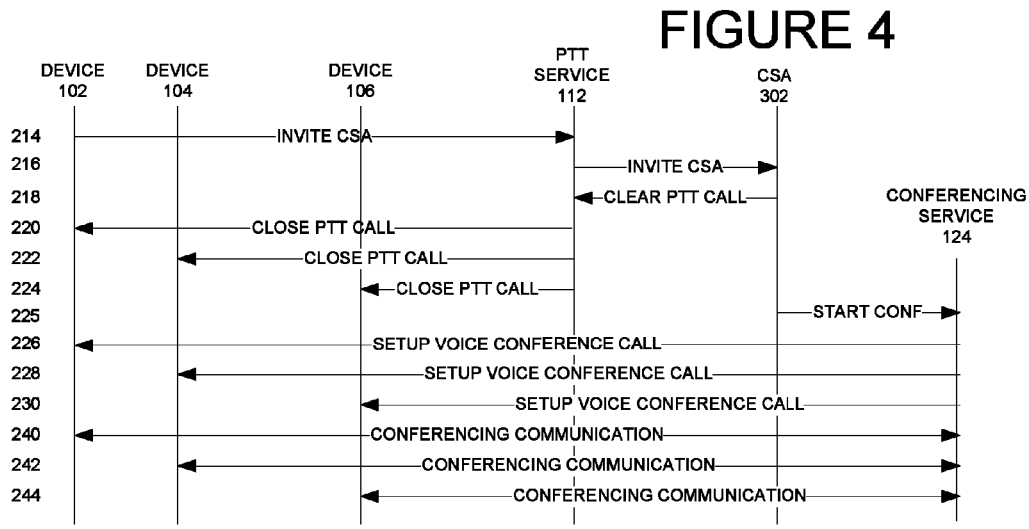
FIG. 4 is a message flow diagram outlining example messages which may flow between different elements of the system of FIG. 3 according to an embodiment of the present invention.

Referring now to FIG. 4, it is assumed that a push-to-talk communication is already established, as described above and as shown in FIG. 2. If a user, such as the user of the communication terminal 102, wishes to establish a conventional telephone conference with the participants of the push-to-talk communication, the user invites the CSA 302 in the conventional manner. The communication terminal 102 sends an invite message to the PTT service manager 112, as shown by message 214. The PTT service manager 112 receives this message and determines that it is a request for the CSA 302 to join the PTT communication. The PTT service manager forwards the request, as message 216, to the CSA 302 in a conventional manner. The CSA 302 is configured to automatically accept the request. The CSA 302 obtains address details of each of the participants of the current PTT communication, for example, from the request message 216. As previously mentioned, the contact details may be in the form of a SIP URI.

However, in order for a telephone conference to be established the telephone subscriber numbers of the communication terminals in the current PTT communication need to be determined, since terminals in conventional voice networks are addressed using telephone subscriber numbers. The CSA 302 thus sends the obtained address details of the participants of the PTT communication to a resolution service (not shown), which resolves, for example, a SIP URI into a corresponding telephone subscriber number. The resolution service could, for example, be provided by a database maintained by the PTT service manager 112 and accessible by the CSA 302 through an appropriate interface, much in the way that domain name server (DNS) resolution is performed in the Internet world.

Once the CSA 302 has received the resolved telephone subscriber numbers it sends a message 218 to clear the PTT communication to the PTT service manager 112. The PTT service manager 112 translates this message into standard PTT close PTT call messages 220, 222 and 224 which are sent to each of the participants of the PTT communication. This causes each of the communication terminals 102, 104 and 106 to close their respective PTT calls.

The CSA 302 sends a message 225 to initiate the conference call to the conferencing service 124. The message 225 preferably contains the telephone number of each participant to the PTT communication. The conferencing service 124, upon receipt of message 225, initiates a telephone call with each of the telephone subscriber numbers of the communications terminals 102, 104 and 106, represented by messages 226, 228 and 230. As each of the communication terminals answers its respective call, the conferencing service bridges each call to provide the conference call enabling the user of each communication terminal to participate in the conference call, as represented by the messages 240, 242 and 244. It should be noted, however, that the CSA 302 preferably remains as the sole participant to the PTT communication until the conference call terminates. Upon termination of the conference call, the conference service preferably sends a message (not shown) to the CSA 302 which terminates the PTT communication at the PTT service manager 112.

Figure 5:
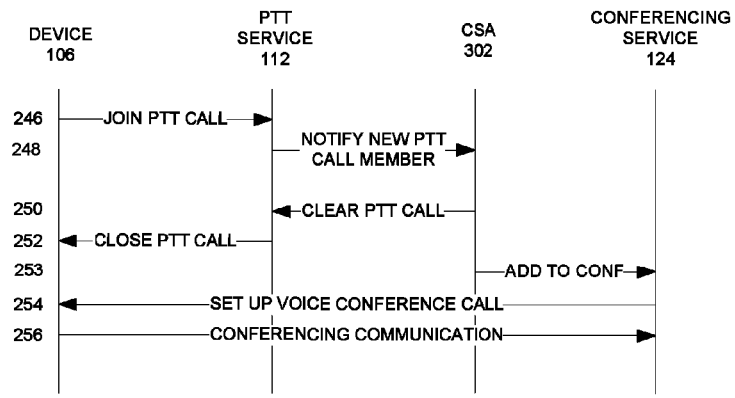
FIG. 5 is a message flow diagram outlining example messages which may flow between different elements of the system of FIG. 3 according to an embodiment of the present invention.

Referring now to FIG. 5 there is a shown a situation where one of the invited participants to the PTT communication, such as the user of communication terminal 106, received the initial push-to-talk invitation to join the push-to-talk communication, but for example, did not accept the invitation. This may occur, for example, if the user did not hear an audible alert alerting the user to the fact that he was invited to participate in a PTT communication. Assuming that the user discovers that he failed to respond to such an invite, for example, by consulting a list of missed invites accessible via the communication terminal, the user decides to join the PTT communication.

The user of the communication terminal 106 joins the PTT communication by actuating an appropriate button on his communication terminal which causes the communication terminal 106 to send a join PTT call message 246 to the PTT service manager 112. The message 246 includes a PTT call identifier, received during the initial invite message 206, which enables the PTT service manager 112 to identify the other participants of the PTT communication. The PTT service manager 112 determines, thereby, that the CSA 302 is the sole participant of the PTT communication, and notifies, by way of message 248, that the CSA 302 that a new participant is requesting to join the PTT communication. In response, the CSA 302 sends a clear PTT call message 250 to the PTT service manager 112 which sends a close PTT call message 252 to the communications terminal 106. The communications terminal 106 terminates the PTT call in response to this message. The CSA 302 adds the communication terminal 106 to the telephone conference by sending an add to conference message 253 to the conferencing service 124, after having resolved the telephone subscriber number for the communication terminal 106. The conference service 124 sets up the telephone call, as represented by message 254, and bridges the communications terminal 106 to the conference upon answer. The user of the communications terminal 106 may then participate in the established conference call, as represented by message 256.

The above-described embodiments are described principally with reference to establishing a communication on a second communication system from within a communication on a first communication system, where the first type of communication system is a push-to-talk communication and where the second type of communication system is a telephone conference communication. However, those skilled in the art will fully appreciate that the above-described embodiments are not limited for use with any particular communication systems.

For example, a communication using a conventional telephone conference may be switched to an instant messaging communication on an instant messaging communication system by inviting a predetermined telephone subscriber number to the telephone conference. The invitation may, for example, take the form of requesting the conferencing service to add the predetermined telephone subscriber number to the conference. Alternatively, the invitation could take the form of an SMS message sent to the predetermined telephone subscriber number by one of the participants of the conference. The predetermined telephone subscriber number is preferably associated with a suitable intermediate module, such as a control module of the conferencing service, and the invitation, when received by the predetermined telephone subscriber number, is used as a trigger for establishing a communication using an instant messaging system. In this case, an address, such as a SIP address, for each of the participants may be determined through use of a suitable address resolution service.

Preferably, a user is able to establish a communication on any suitable kind of communication system from any other suitable type of communication system, simply by inviting a specific predetermined user. For example, a user of a push-to-talk communication may invite a first predetermined user to cause a conventional telephone conference to be established, or may invite a second predetermined user to cause an instant messaging communication to be established.

The above described techniques may also be used to enable a participant of a communication using a first communication system to invoke a specific action on that communication system by inviting a specific predetermined user to that communication. For example, a participant to a push-to-talk communication with, say, ten participants, may be able to cause the whole push-to-talk communication to be terminated by inviting a specific predetermined 'terminate PTT session' user to the communication.

Taking push-to-talk as an example, a user may be able to store many different predetermined users in his contact list, with each of the predetermined users causing a specific action to be invoked upon their invitation to the current communication. Thus, a push-to-talk user may have a number of contacts such as "Convert to telephone conference", "Terminate whole session", "Convert to instant messaging session" included in his contact list.

Those skilled in the art will appreciate that the above described techniques are particularly applicable to communication systems having a centralised communication manager through which a communication is established. For example, in a push-to-talk system such a communication manager may be a push-to-talk service manager, and in a conventional telephone conference the communication manager may be a telephone conferencing service.

Those skilled in the art will appreciate that reference made herein to mobile telephones and mobile networks are not limited thereto, and other fixed line or equivalent networks may be used in a similar manner.

The invention claimed is:

1. A method, during a first communication on a first communication system, of establishing multiple instances of a different type of communication on a second communication system, comprising:
    receiving an invitation, including a number of address details of at least one participant of the first communication, by a predetermined user having an address to join the first communication, wherein the address is stored in a contact list of a first communication terminal, an intermediate module arranged for, in response to receiving the invitation of the predetermined user, establishing the multiple instances of a different type of communication on a second communication system, wherein the first communication is a push-to-talk communication, wherein the multiple instances of the different type of communication are a telephone conference, wherein receiving an invitation includes:
    receiving the invitation at the intermediate module capable of accessing the address details of each participant within the invitation, wherein the intermediate module has communication access to a first communication manager and upon receiving the invitation, the intermediate module causing the first communication manager to terminate the first communication.

2. The method according to claim 1, wherein the first communication is established through the first communication manager.

3. The method according to claim 2, wherein the first communication manager is a push-to-talk service manager, and wherein the second communication manager is a telephone conferencing service.

4. The method according to claim 2, wherein the intermediate module is a media conferencing agent.

5. The method according to claim 1, wherein the multiple instances of the different type of communication are established through a second communication manager.

6. The method according to claim 1, wherein the first communication is established between a plurality of users, and wherein the multiple instances of the different type of communication are established between at least some of the plurality of users.

7. The method according to claim 1, wherein the intermediate module has communication access to a second communication manager, and further comprising, upon receiving the invitation, the intermediate module causing the second communication manager to establish the multiple instances of the different type of communication.

8. A telecommunications system having a first communication system for establishing a first communication, and a second communication system capable of establishing multiple instances of a different type of communication, comprising:

an intermediate module for receiving an invitation, including a number of address details of at least one participant of the first communication, through the first communication system, the invitation received at an address, wherein the address is stored in a contact list of a first communication terminal the intermediate module arranged to, in response to receiving the invitation, establish the multiple instances of the different type of communication on the second communication system, wherein the first communication is a push-to-talk communication, wherein the multiple instances of the different type of communication are a telephone conference; and the intermediate module capable of accessing the address details of each participant within the invitation and having communication access to a first communication manager, and being arranged to, upon receiving the invitation, cause the first communication manager to terminate the first communication.

9. The telecommunications system of claim 8, the first communication system further comprising the first communication manager for establishing the first communication between a plurality of users.

10. The telecommunications system of claim 8, the second communication system further comprising a second communication manager for establishing the multiple instances of the different type of communication between at least some of the plurality of users.

11. The telecommunications system of claim 8, wherein the intermediate module has communication access to the second communication manager.

12. The telecommunications system of claim 8, the intermediate module being arranged, upon receiving the invitation, to cause the second communication manager to establish the multiple instances of the different type of communication.

13. The telecommunications system of claim 8, wherein the first communication manager is a push-to-talk service manager, and wherein the second communication manager is a telephone conferencing service.

14. The telecommunications system of claim 8, wherein the intermediate module is a media conferencing agent.

15. A telecommunications system arranged to operate in accordance with claim 1.

16. A method, during a first communication on a first communication system, of invoking an action on a communication manager used to establish the first communication, comprising:

inviting a predetermined user to the communication;
receiving the invitation, including a number of address details of at least one participant of the first communication, at an intermediate module, the intermediate module having an address, wherein the address is stored in a contact list of a first communication terminal and, upon receipt of the invitation, the intermediate module accessing the address of each participant within the invitation, establishing multiple instances of a different type of communication on a second communication system, and causing the communication manager to invoke a predetermined action, wherein the first communication is a push-to-talk communication wherein the multiple instances of the different type of communication are a telephone conference, wherein the predetermined action includes:

causing the communication manager to terminate the first communication.

17. A telecommunication system having a first communication system for establishing a first communication, the first communication being established through a first communication manager, comprising:

an intermediate module for receiving an invitation, including a number of address details of at least one participant of the first communication, through the first communication system, the intermediate module having an address, wherein the address is stored in a contact list of a first communication terminal, the intermediate module being arranged to, in response to receiving the invitation, access the address details of each participant within the invitation, establish multiple instances of a different type of communication on a second communication system, and invoke a predetermined action on the communication manager, wherein the first communication is a push-to-talk communication, wherein the multiple instances of the different type of communication are a telephone conference, wherein the predetermined action includes:

causing the first communication manager to terminate the first communication.

* * * * *

UNITED STATES PATENT AND TRADEMARK OFFICE
CERTIFICATE OF CORRECTION

PATENT NO. : 8,391,908 B2
APPLICATION NO. : 11/791315
DATED : March 5, 2013
INVENTOR(S) : Sebastien Bouat It is certified that error appears in the above-identified patent and that said Letters Patent is hereby corrected as shown below:

In the Claims

In column 10, line 23, in Claim 16, delete "communication wherein" and insert -- communication, wherein --, therefor.

Signed and Sealed this
Ninth Day of July, 2013

Teresa Stanek Rea
*Acting Director of the United States Patent and Trademark Office*